United States Patent
Yamashita et al.

(10) Patent No.: US 6,510,192 B1
(45) Date of Patent: *Jan. 21, 2003

(54) BOILING WATER TYPE NUCLEAR REACTOR CORE AND OPERATION METHOD THEREOF

(75) Inventors: Junichi Yamashita, Hitachi (JP); Kumiaki Moriya, Hitachi (JP); Katsumasa Haikawa, Jao-machi (JP); Yasuhiro Masuhara, Hitachinaka (JP); Taichi Takii, Hitachi (JP); Akihiro Yamanaka, Hitachi (JP); Takao Kondo, Hitachi (JP); Motoo Aoyama, Mito (JP); Masao Chaki, Hitachi (JP)

(73) Assignee: Hitachi, Ltd., Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/703,933

(22) Filed: Nov. 2, 2000

Related U.S. Application Data

(62) Division of application No. 09/048,494, filed on Mar. 27, 1998, now Pat. No. 6,205,196.

(30) Foreign Application Priority Data

Mar. 31, 1997 (JP) ................................................ 9-79555

(51) Int. Cl.$^7$ ............................ G21C 3/34; G21C 7/113
(52) U.S. Cl. ........................ 376/260; 376/438; 376/434; 376/444; 376/333; 376/327; 376/219
(58) Field of Search ................................ 376/438, 444, 376/434, 219, 327, 333, 260

(56) References Cited

U.S. PATENT DOCUMENTS

| | | | | |
|---|---|---|---|---|
| 3,194,743 A | * | 7/1965 | Deddens et al. | 376/219 |
| 4,678,629 A | * | 7/1987 | Popa | 376/419 |
| 4,789,518 A | * | 12/1988 | Batheja et al. | 376/353 |
| 4,926,450 A | * | 5/1990 | Masuhara et al. | 376/444 |
| 5,128,093 A | * | 7/1992 | Ose | 376/219 |
| 6,205,196 B1 | * | 3/2001 | Yamashita et al. | 376/438 |

FOREIGN PATENT DOCUMENTS

| | | |
|---|---|---|
| JP | 4-296693 | 10/1992 |
| JP | 4-301596 | 10/1992 |
| JP | 5-249275 | 9/1993 |
| JP | 6-138275 | 5/1994 |
| JP | 6-174874 | 6/1994 |

* cited by examiner

Primary Examiner—Michael J. Carone
Assistant Examiner—Jack Keith
(74) Attorney, Agent, or Firm—Mattingly, Stanger & Malur, P.C.

(57) ABSTRACT

A boiling water type nuclear reactor core, in which a plurality of fuel assemblies, each enclosed in a channel box, are loaded and a plurality of control rods, each having control blades, are arranged between the channel boxes. Long blade control rods, each having control rod blades which extend in four directions, are arranged between channel boxes on diagonals of square bundle regions each formed by a plurality of fuel assemblies, and short blade control rods, each having a control rod blade length of about half of the width of one of the square bundle regions, are arranged between the channel boxes in the center of each of the square bundle regions.

3 Claims, 10 Drawing Sheets

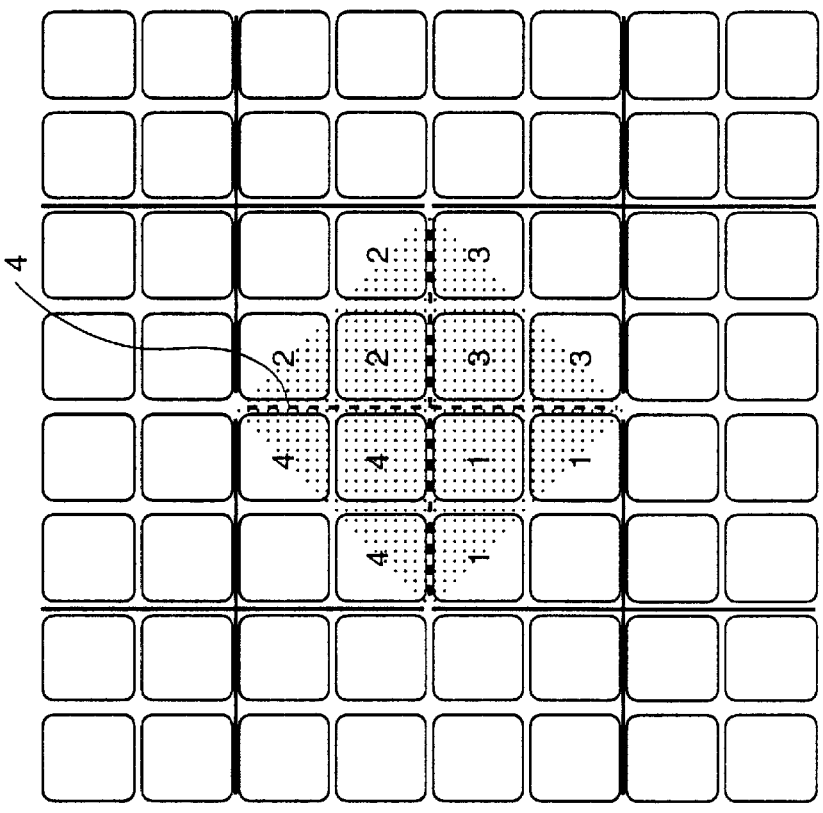
FIG.3B
CONVENTIONAL LATTICE
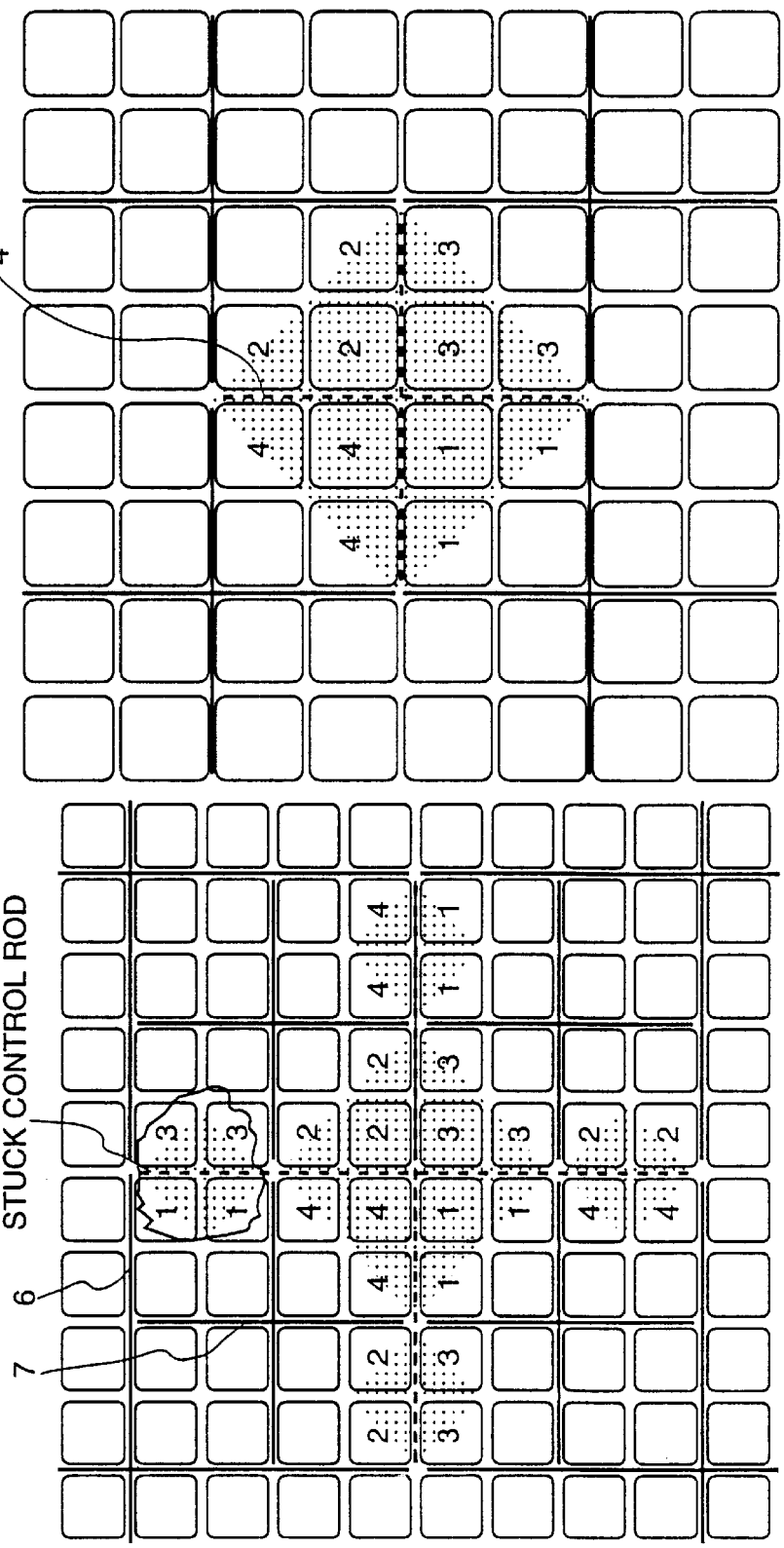
FIG.3A
THE PRESENT INVENTION
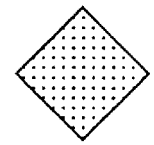 UNCONTROLABLE REGION BY CONTROL ROD

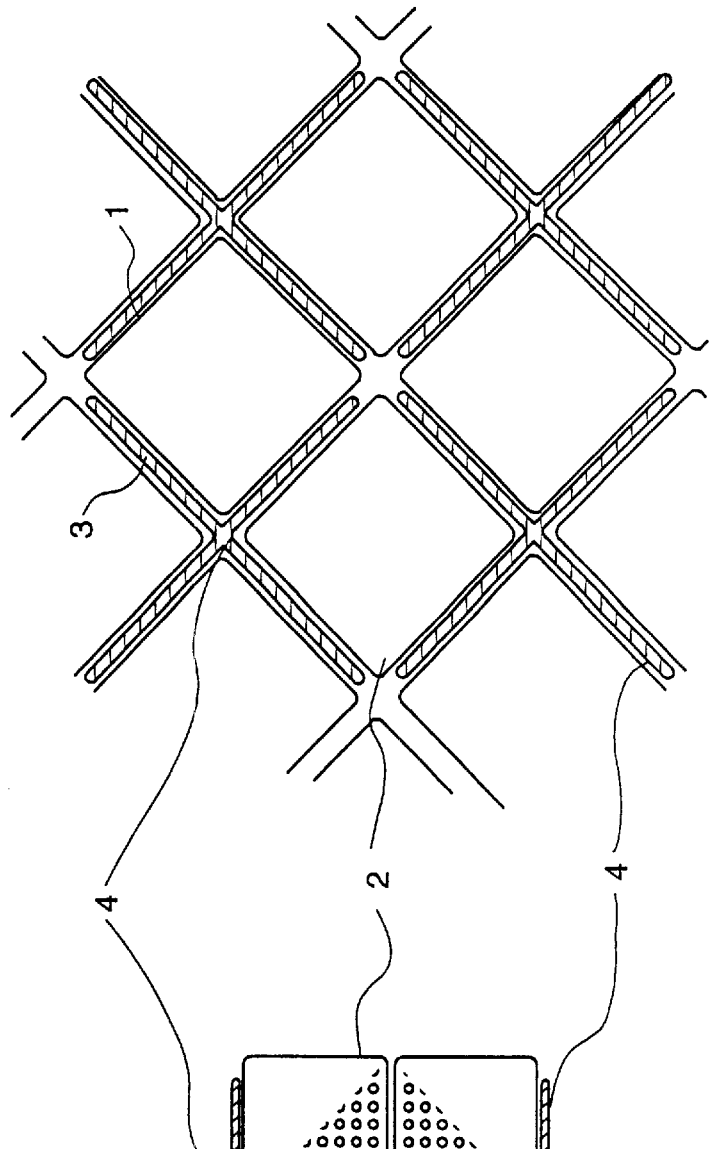
FIG.11A CONVENTIONAL LATTICE
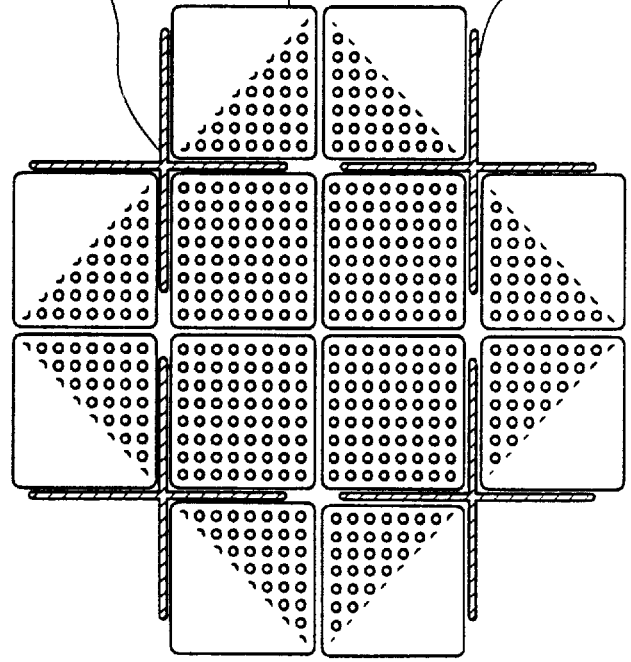
FIG.11B LARG-SIZED LATTICE

BOILING WATER TYPE NUCLEAR REACTOR CORE AND OPERATION METHOD THEREOF This is a divisional application of U.S. Ser. No. 09/048, 994, filed Mar. 27, 1998 now U.S. Pat. No. 6,205,196.

BACKGROUND OF THE INVENTION

The present invention relates to a reactor core and a control rod system of a boiling water type nuclear reactor for power generation.

A core of an advanced boiling water type nuclear reactor (hereunder, referred to as ABWR) which is the newest of the boiling water type nuclear reactors used for power generation is constructed of fuel assemblies 2 arranged in a lattice form and control rods 4 between the fuel assemblies 2, as shown in FIG. 8. The fuel assemblies 2 each are constructed of a plurality of fuel rods and a channel box 1. The control rods 4 are used for reactivity control at time of operation, emergency shutdown of the reactor (scram) and reactor shutdown. The control rods 4 are inserted between channel boxes which are outer walls of the above-mentioned fuel assemblies 2 by a driving mechanism arranged at a lower portion of the nuclear reactor pressure vessel.

FIGS. 9 and 10 show a construction of a control rod 4. The control rod 4 is formed of a body and control rod blades 3 extending from the body in 4 directions. Each control rod blade 3 has neutron absorbers 8 inserted therein, and the control rod blades 3 are inserted inside the core to absorb excessive neutrons, thereby to control excessive reactivity.

JP A 6-174874 discloses a technique that a fuel assembly is large-sized while maintaining thermal margin and reactor shutdown margin, whereby the fuel assemblies loaded in the core are made large in size and the number of the fuel assemblies is reduced, thereby to effect labor-saving for fuel exchange.

As shown in FIG. 11B, in a large-sized fuel assembly core, positions of the control rods 4 are the same as in the conventional lattice core, but the control rods are rotated by 45°, and the large-sized fuel assemblies are arranged inside the control rods. Therefore, the large-sized fuel assembly corresponds to 2 conventional fuel assemblies. Further, form a point of view of securing a reactor shutdown margin, the blades 3 of the control rod are made large-sized, and arranged between the channel boxes 1 on the diagonal of the fuel assemblies.

However, the above-mentioned conventional technique has the following problems which need to be solved.

That is, although the number of fuel assemblies is reduced by making the fuel assemblies into a large size, the number of control rods is nearly equal to that in a conventional plant. In order to sufficiently secure a shutdown margin of the large-sized fuel assemblies, the blade length of the control rod is increased, whereby a cost of a control rod is raised, so that the plant as whole becomes high in cost.

Further, in order to advance making higher the burning degree and the saving of Uranium, an amount of loaded fuel and the number of Gd fuel rods increase and a reactor shutdown margin decreases.

SUMMARY OF THE INVENTION

An object of the present invention is to provide a boiling water type nuclear reactor core which is provided with control rods enabling to secure sufficient control rod worth without widely changing equipment and making higher a manufacturing cost and an operation method thereof.

According to the present invention, in order to achieve the above object, in a boiling water type nuclear reactor core in which a plurality of fuel assemblies each enclosed in a channel box are loaded and a plurality of control rods each having control blades are arranged between the channel boxes, long blade control rods each having control rod blades which extend in 4 directions latitudinally are arranged between channel boxes on diagonals of square bundle regions each formed by a plurality of fuel assemblies, and short blade control rods each having a control rod blade length in a lititudinal direction of about one half of the width of a square bundle region are arranged between the channel boxes in the center of each of the square bundle regions.

According to the present invention, in the long blade control rod, a region in which the long blade control rod covers the fuel assembles increases by an increment in the blade latitudinal length, whereby the control rod worth as a single control rod increases. Accordingly, since the control rod itself becomes large in size, there is left a problem of securing a reactor shutdown margin in a case where one control rod can not be inserted.

To solve the problem, change in the reactivity when one of the long blade control rods is pulled out is analytically obtained. FIGS. 3A and 3B each show an uncontrollable region of fuel assemblies when one 6, 4 of the control rods was pulled out, in comparison with the conventional lattice. In FIGS. 3A, 3B, the control rod 6, 4 which was pulled out in this example corresponds to a stuck control rod (failed to be inserted) or a control rod pulled out by mistake. These cases are substantially the same as each other from a viewpoint of reactor shutdown margin Since the large-sized lattice fuel assembly of the present invention corresponds to four of the conventional fuel assemblies and the large-sized fuel assembly is divided into 4 blocks (hereunder, referred to as mini bundles), that is, since a square bundle region defined by latituinal long control rod blades is constituted of 4 of the large-sized fuel assemblies and each large-sized fuel assembly is divided into the four mini-bundles, an uncontrollable region by the control rods is shown on the mini bundles by half tone expression.

Numbers 1, 2, 3, 4 given on each mini-bundle express fuel at the first cycle, the second cycle, the third cycle and the fourth cycle after loading. An example of a fuel loading pattern is shown by the numbers 1–4. This pattern is an example of a practical fuel arrangement in view of the following point.

Rearrangement of the mini-bundles forming a fuel assembly is not conducted an avoid to increase in labor for fuel exchange; and concentration of bundles of the same cycle (under a sever condition) around one control rod should be avoided.

In the conventional lattice, an uncontrollable region is a rhombic region including the control rod, The present invention, however, includes 4 small rhombic regions (shown by half-tone) other than the above-mentioned rhombic region, and the shutdown margin seems to be reduced. However, since the small rhombic regions are surrounded by lititudinal short blade control rods 7 adjacent thereto and latitudinal long blade control rods 6, it is expected that the regions are influenced by those short control rod blades and long control rod blades and the effect of reduction of reactor shutdown margin is small in the regions. According to the analytic result, compared with the conventional lattice, a reduction amount of the reactor shutdown margin in the present invention is 1 %Δk or less, the reactor shutdown margin is almost the same as the conventional lattice, and it is found that the reactor shutdown margin can be secured.

Therefore, use of the latitudinal long blade control rod enables increase in control rod worth as a single rod, so that the number of the control rods and the number of control rod driving devices can be reduced largely by the number corresponding to an increment of the control rod worth and a cost can be reduced. Further, the control system can be simplified by reduction of both the number of the control rods and the number of the control rod driving devices.

BRIEF DESCRIPTION OF THE DRAWINGS

FIGS. 3A and 3B are schematic diagrams showing a lattice according to the present invention and a conventional one, respectively, for a comparison of an uncontrollable region according to the present invention and that of the conventional core lattice in connection with a reactor shutdown margin;

FIG. 11A is a schematic diagram of a conventional lattice fuel; and

FIG. 11B is a schematic diagram of a conventional large-sized lattice fuel.

DESCRIPTION OF EMBODIMENTS OF THE INVENTION

Figure 1:
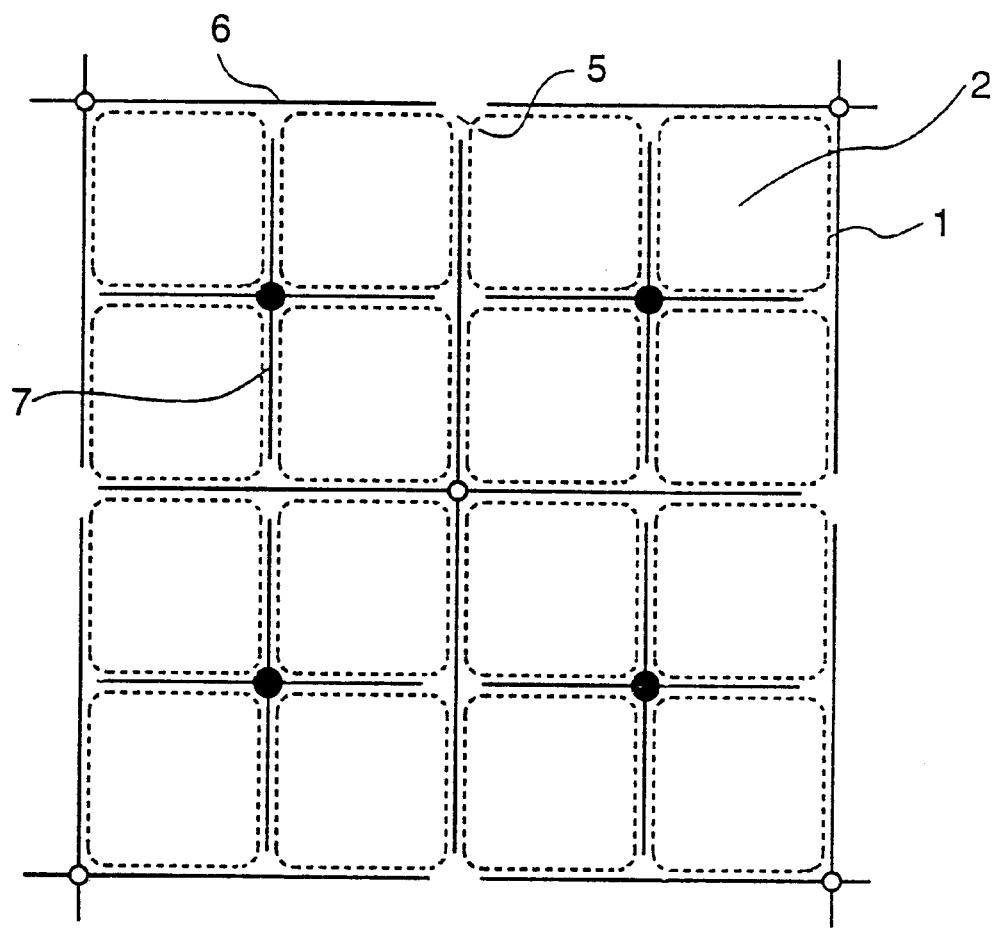
FIG. 1 is a schematic diagram of an arrangement of fuel assemblies and control rods of an embodiment of the present invention.

Embodiments of the present invention will be explained hereunder, referring to the drawings.

FIG. 1 shows an embodiment of the present invention. In this embodiment, in a boiling water type nuclear reactor in which a plurality of fuel assemblies 2 each surrounded by a channel box 1 are loaded, and a plurality of control rods having control rod blades each disposed between the channel boxes, long blade control rods 6 each having control rod blades extending latitudinally in four directions, respectively, are arranged between the channel boxes on a diagonal of each of square bundle regions each formed of a plurality of (four in this embodiment) the fuel assemblies 2, and short blade control rods 7 each are arranged between channel boxes of each of the square bundle regions at the center of the region, each of which short e blade control rods 7 has a blade length (in a lateral or latitudinal, direction) of about one half of the width of one of the square bundle regions, for example, substantially the same as the width of each of the above-mentioned fuel assemblies.

With this construction, as mentioned above, in the long blade control rod 6 arranged between the channel boxes on the diagonal, the control rod worth per one rod increases and the number of control rods and the number of control rod driving devices can be reduced by the number corresponding to an increment of the control rod worth, so that the cost can be reduced. Quantitatively, the number of the control rods can be reduced by 25% as compared with the conventional lattice.

Figure 2:
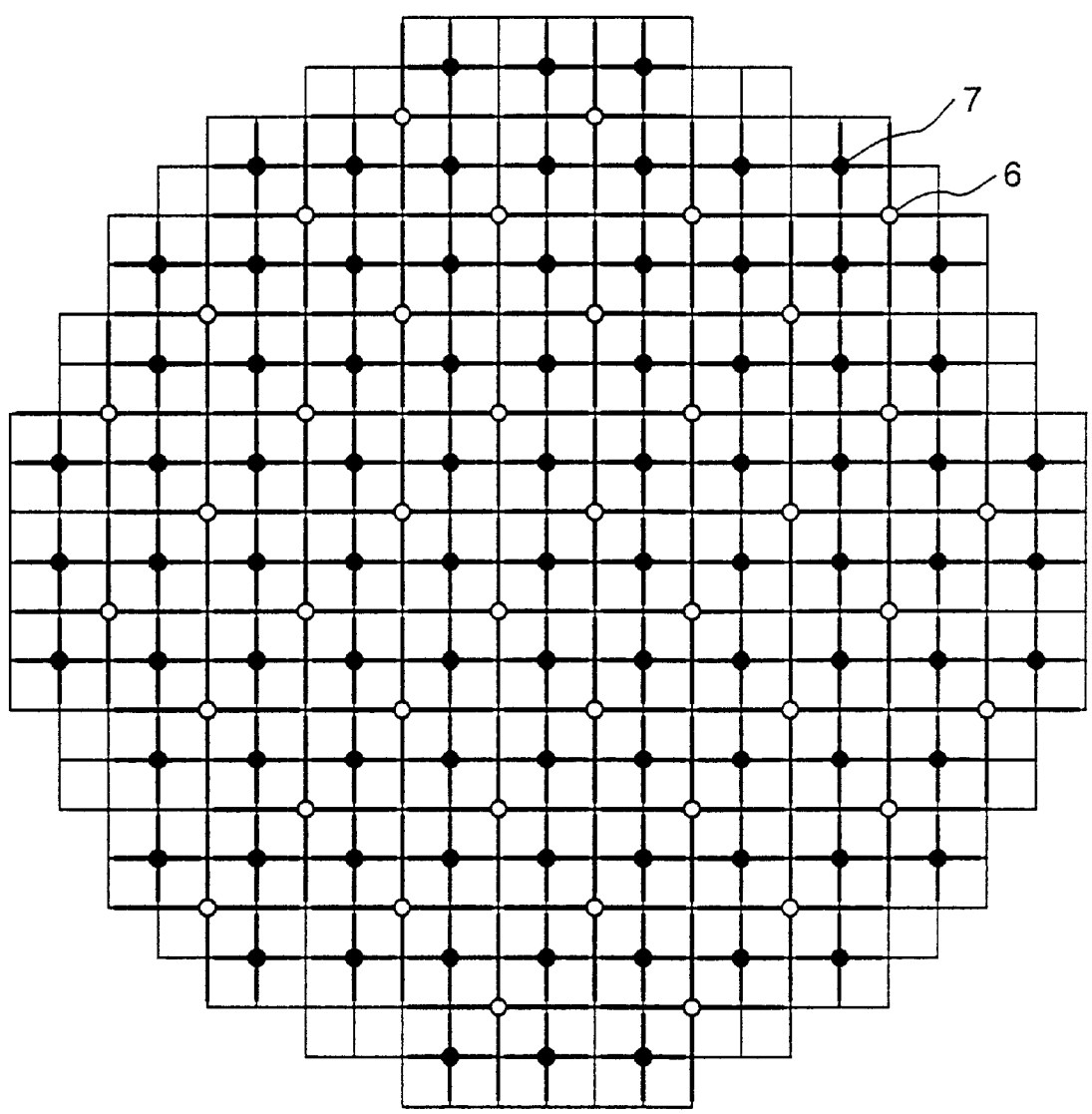
FIG. 2 is a schematic diagram of an arrangement of control rods according to the present invention.

FIG. 2 shows an arrangement of the control rods, over the whole reactor core. Symbols ○ denote the latitudinal long blade control rods 6 and symbols ● denote the latitudinal short blade control rods 7. Moreover, as clearly shown in both FIGS. 1 and 2, the long blade control rods each have a blade length in a latitudinal direction which is about twice as long the blade length in a latitudinal directional of the short blade control rods. It is found that the number of control rods and the number of the control rod driving devices can be reduced largely as compared with the conventional arrangement and the control rod system can be simplified. Further, as explained previously in the summary of the invention, the reactor shutdown margin can be secured easily and the number of control rods is reduced. As a result, Gd for securing a reactor shutdown margin does not remain and low inventory fuel is not loaded, whereby economy is improved greatly.

Further, in this embodiment, by sharing the role of the control rods such that the long blade control rods on the diagonal serve for reactor shutdown and the short blade control rods at central portions are for controlling reactivity during operation and at time of scram, the system can be rationalized and simplified, and the cost of the whole plant can be reduced.

Further, in the short blade control rods for controlling reactivity, by using a neutron absorber of material ($B^{10}$) which has a high reactivity effect, the control rod worth of the short blade control rods increases, and scram characteristic and reactivity control characteristic can be increased.

Further, since the long blade control rods on the diagonal are not used for scram, a control system of high speed scram, etc. can be omitted, which enables use of a hydraulic driving system of a low cost, whereby a cost is reduced largely.

Further, in the above-mentioned embodiment, it is possible to share the role of the control rods such that the long blade control rods 6 on the diagonal are used for controlling reactivity during operation and for shutdown of the reactor and the central short blade control rods 7 are used scram. In this case, the system is rationalized and simplified as mentioned above, so that reduction of the cost can be expected.

Further, in the arrangement as shown in FIG. 1, another embodiment, in which the reactivity worth of a control rod is improved at an upper region thereof, is explained hereunder with respect to a neutron absorber used in a control rod. In this embodiment, in particular, enrichment of $B^{10}$ in the short blade control rod arranged at the central portion of the square bundle is made relatively high at the upper region.

In general, in a boiling water type nuclear reactor, since a void ratio is higher at an upper region of the reactor during operation, neutron spectrum is hardened, and production of $Pu^{239}$ by neutron absorption is promoted. Therefore, the enrichment of fissionable materials becomes high at an upper portion of the reactor and the reactor shutdown margin in the region decreases relatively.

Figure 4:
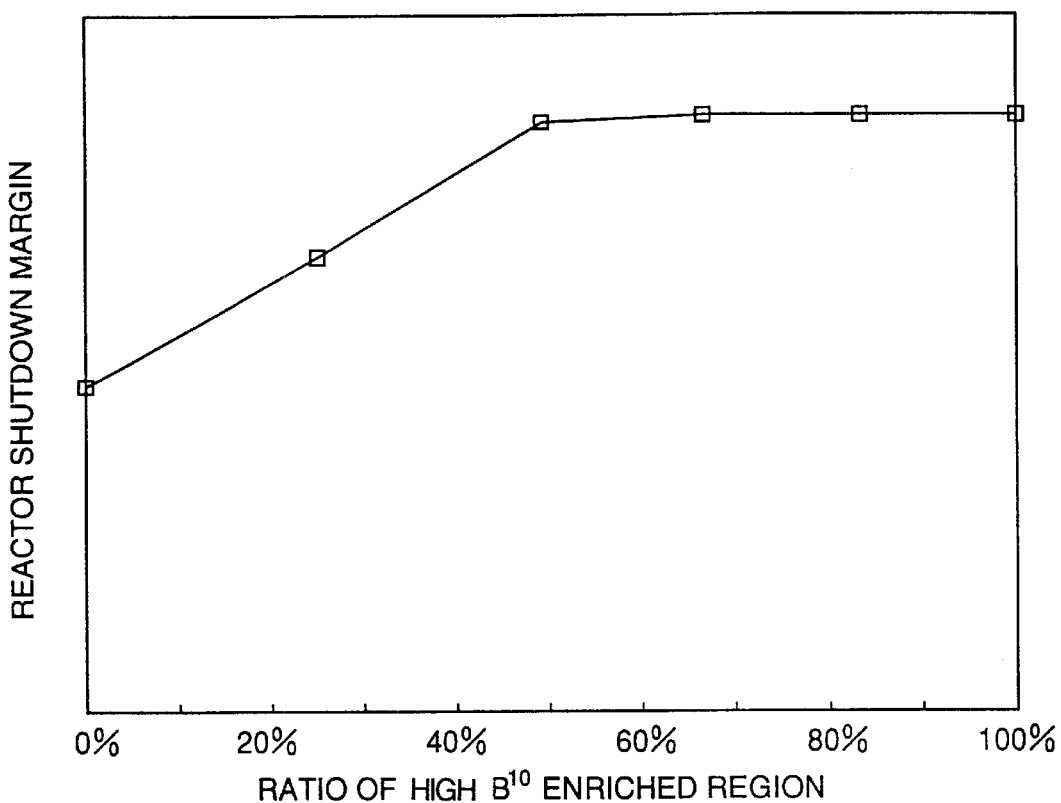
FIG. 4 is a graph showing a relation between B enrichment degree and reactor shutdown margin.

In this embodiment, the enrichment of $B^{10}$ in the upper region of the length of the control rod is increased for the upper region of the nuclear core in which a reactor shutdown margin decreases relatively, whereby the reactor shutdown margin can be increased, as shown in FIG. 4 which is a graph showing the ratio of the high $B^{10}$ enriched region of the control rod to the reactor shutdown margin. Further, since an amount of used $B^{10}$ can be reduced, a manufacturing cost can be reduced. Therefore, a cost of the whole plant can be reduced in total.

Figure 5:
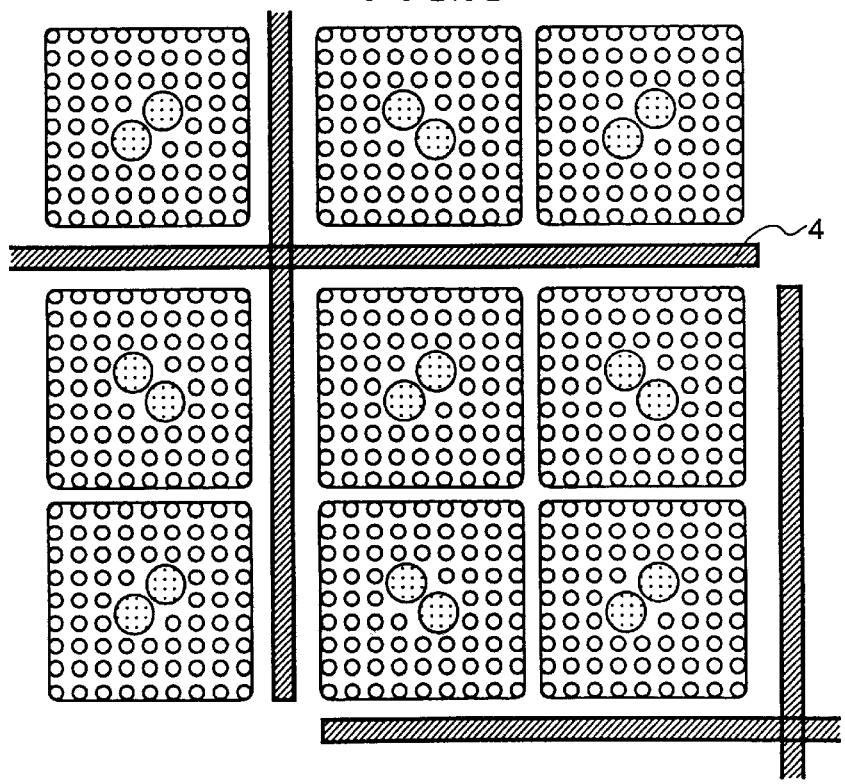
FIG. 5 is a schematic diagram of a conventional core in part.
Figure 6:
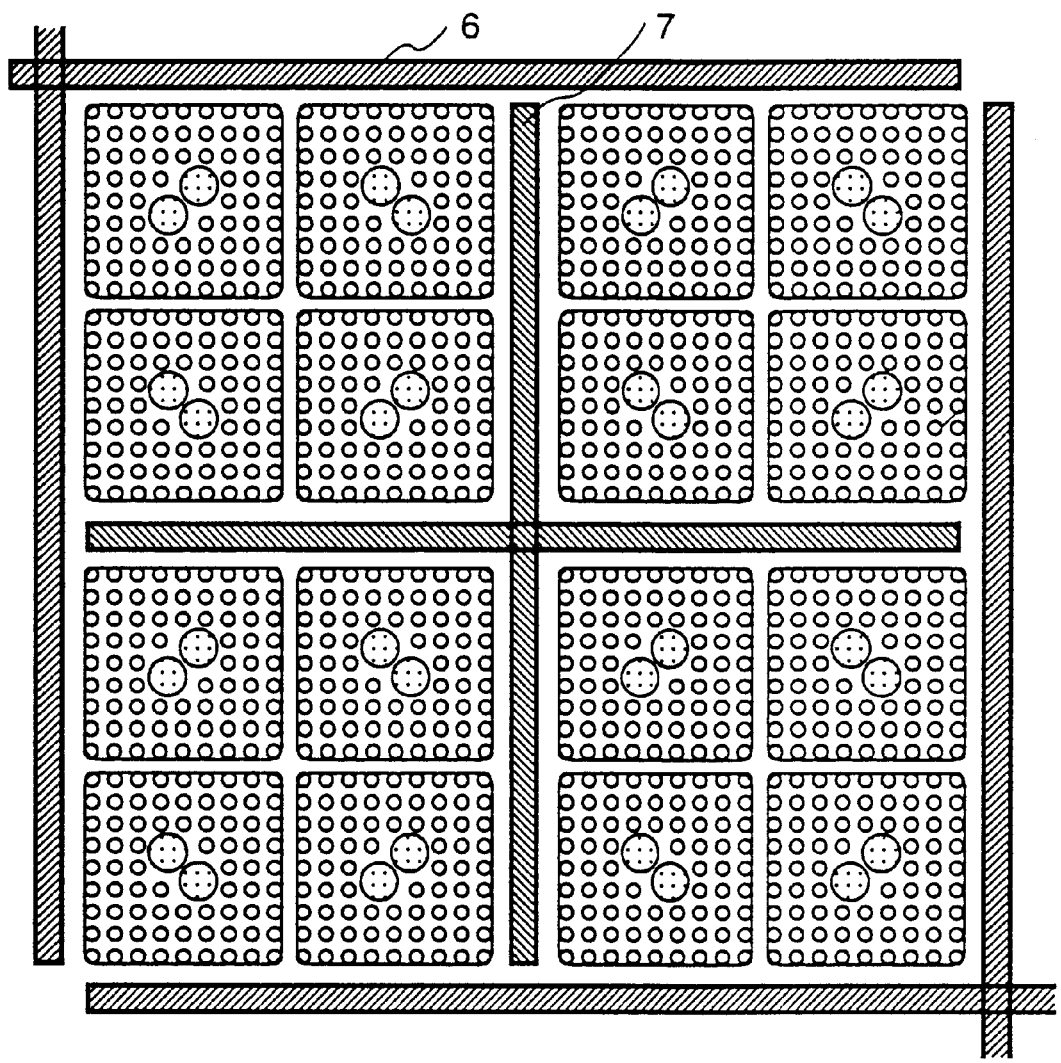
FIG. 6 is a schematic diagram of a core in part of another embodiment of the present invention.

FIGS. 5 and 6 show a conventional core in part and a core in part according to the present invention, each of which is adopted for fuel assemblies of fuel rod lattice structure of 9×9. FIG. 6 shows an embodiment of the present invention in which a large-sized fuel assembly is formed by 4 mini-bundles each of which has a bundle width of about 12 inches (30.5 cm) as used in BWR and, ABWR at present. As in the previous embodiments, in this embodiment in FIG. 6, a cost of the plant can be reduced largely by reduction of the number of control rods. Further, by role sharing of the control rods, a control rod system can be simplified, and a cost the whole plant can be reduced largely. Although not illustrated, fuel rod lattice structures of 8×8 and 10×10 also can be applied.

Figure 7A:
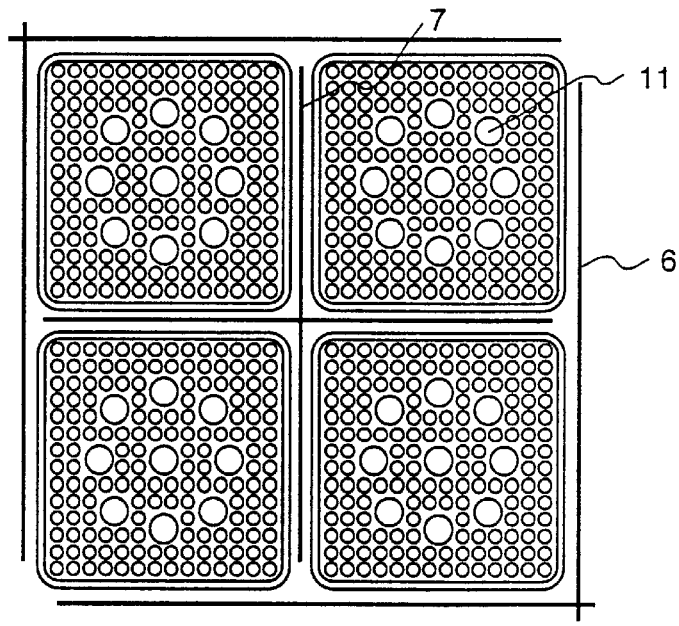
FIG. 7A is a schematic diagram of a core in part of another embodiment of the present invention.
Figure 7B:
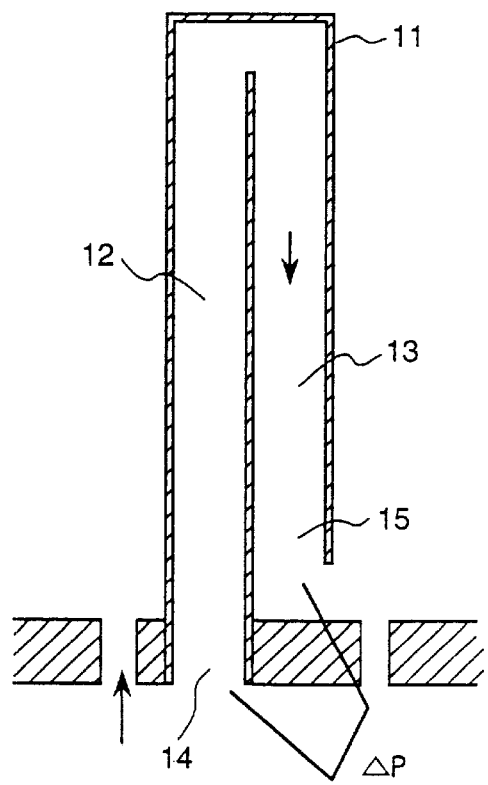
FIG. 7B is a vertical, sectional view of a water rod used in FIG. 7A.
Figure 8:
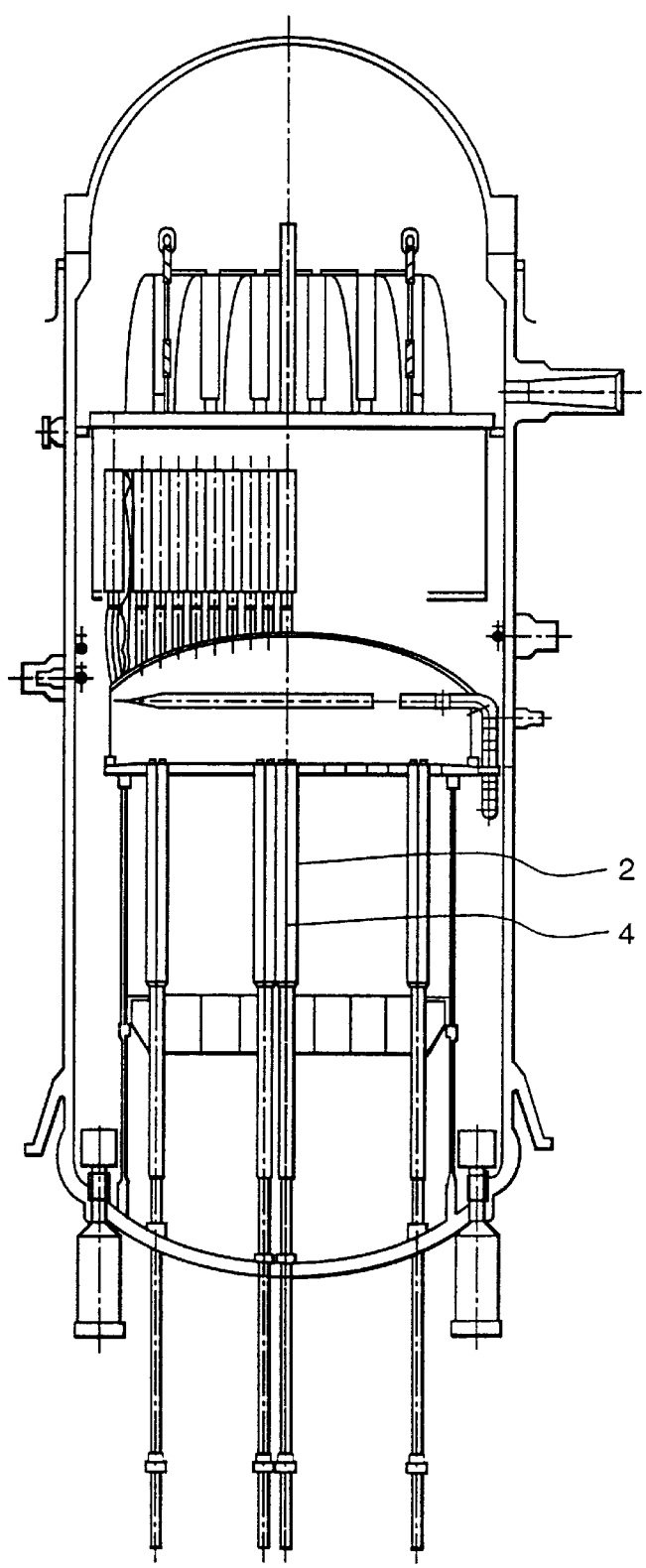
FIG. 8 is a sectional view of a conventional reactor.
Figure 9:
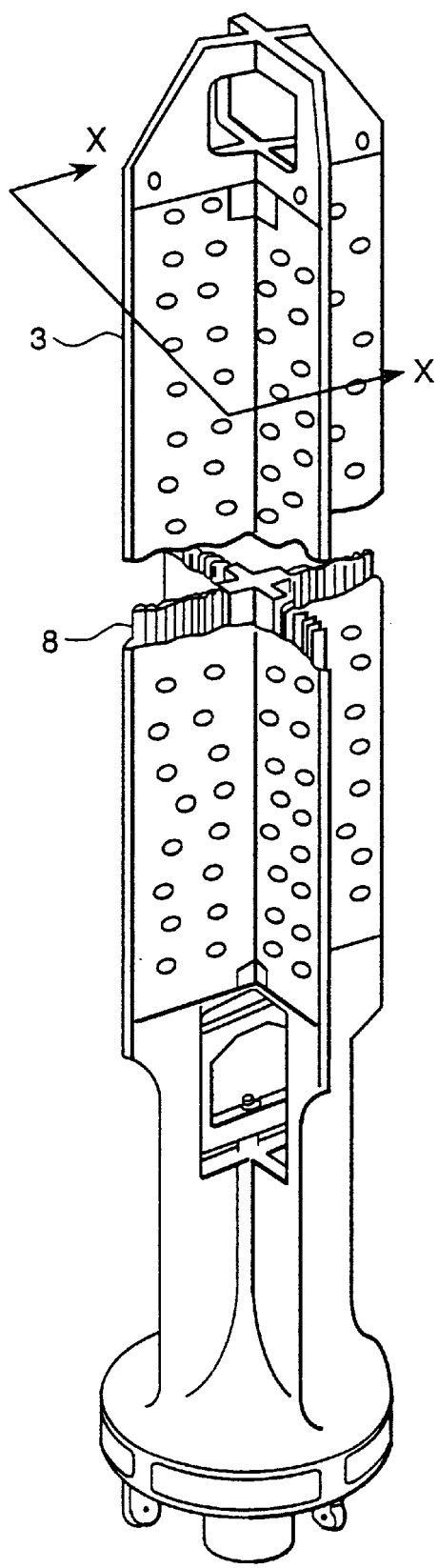
FIG. 9 is a perspective view of a control rod.
Figure 10:
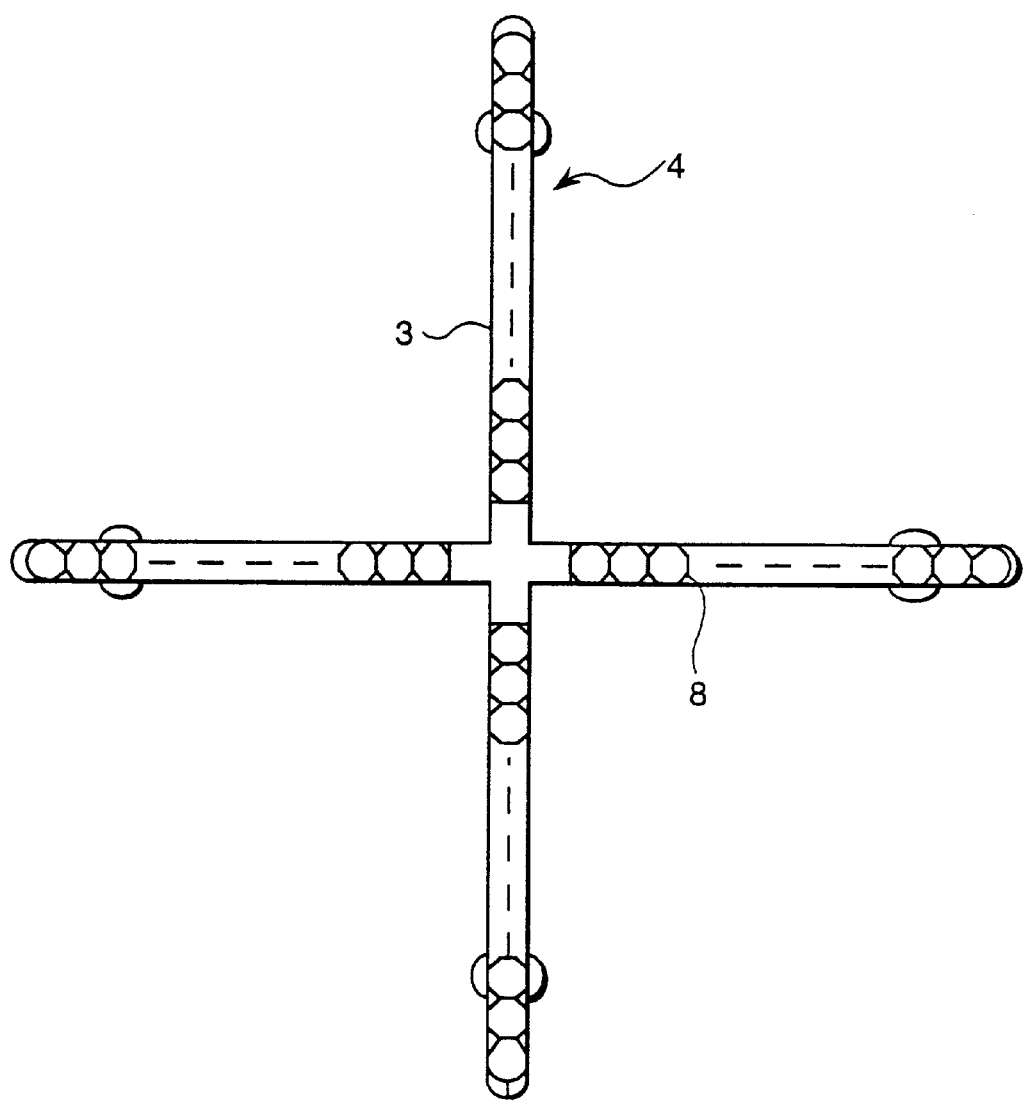
FIG. 10 is a sectional view of the control rod of FIG. 9 taken along a line X—X.

FIGS. 7A and 7B show another embodiment of the present invention. In this embodiment, fuel assemblies 2 constituting a square bundle region as shown in FIG. 1 each have nine (9) water rods 11 as shown in FIG. 7A. As shown in FIG. 7B, each water rod 11 has an ascending flow path 12 and a descending flow path 13, the ascending and descending flow paths 12, 13 are connected to an inflow hole 14 and an outflow hole 15, respectively, and the inflow hole 14 is positioned at a portion lower than the outflow hole 15.

The density of water in each water rod in this embodiment changes largely according to a flow rate of water passing through the fuel assembly. That is, under the condition that a flow rate of water in the core is small, since an amount of steam generated in the water rod becomes larger than an amount of water flowing in the control rod, the water rod inside is filled with steam. When the flow rate of water increases, an amount of water flowing in the water rod goes beyond an amount of steam generated therein, so that the water rod inside is filled with water. Therefore, the water rod inside is filled with steam in operating at a low flow rate in an initial burning stage, whereby an average density of water inside the fuel assembly decreases, so that neutron spectrum is hardened, whereby production of $Pu^{239}$ is promoted.

On the other hand, since the water rod inside is filled with water in operation at a high flow rate in a final burning stage and the average density of water inside the fuel assembly increases, the neutron spectrum is and it is possible to effectively burn $Pu^{239}$ produced in the operation at a low flow rate, and fuel economy is raised. That is, since excessive neutrons in the initial burning stage can be used for production of $Pu^{239}$, the number of short blade control rods can be reduced by a decrease in reactivity control by absorption of excessive neutrons during operation, so that further cost reduction is realized. Further, since a lot of the water rods can be arranged by making the fuel assembly large in size, an effect of effective use of $Pu^{239}$ increases and fuel economy can be improved greatly.

In this invention, since the fuel assemblies each are made large in size as the fuel assemblies in FIG. 1, it is effective from a viewpoint of fuel economy to provide, inside each fuel assembly, water rods the cross-sectional area of each of which corresponds to that of several fuel rods. Further, the reactor shutdown margin can be improved by using such material that control rod worth becomes high at a portion facing central side portions of the fuel assembly 2, as a neutron absorber arranged inside the control rod blades.

According to the present invention, the number of control rods can be drastically reduced without decreasing control rod worth. Further, since the role of the control rod can be shared, the control system can be simplified and rationalized and a cost of the plant can be reduced.

What is claimed is:

1. An operation method of a boiling water type nuclear reactor core in which a plurality of fuel assemblies, each enclosed in a channel box, are loaded and a plurality of control rods, each having control blades, are arranged between said channel boxes, characterized in that:

long blade control rods, each having control rod blades which extend in four directions and each of which is arranged between channel boxes on a diagonal line of square bundle regions, each square bundle region being formed by a plurality of fuel assemblies;

short blade control rods, each having a latitudinal control rod blade length of about one half of the width of each of said square bundle regions and each of which is arranged between said channel boxes in the center of each of said square bundle regions;

said long blade control rods each having a latitudinal control rod blade length of about one of said square bundle regions so as to be twice as long as the latitudinal control rod blade length of each of said short blade control rods; and wherein reactivity control during operation and at time of scram is effected by using said short blade control rods arranged between said central channel boxes of said square bundle region.

2. An operation method of a boiling water type nuclear reactor core in which a plurality of fuel assemblies, each enclosed in a channel box, are loaded and a plurality of control rods, each having control blades, are arranged between said channel boxes, characterized in that:

long blade control rods, each having control rod blades which extend in four directions and each of which is arranged between channel boxes on a diagonal line of square bundle regions, each square bundle region being formed by a plurality of fuel assemblies;

short blade control rods, each having a latitudinal control rod blade length of about one half of the width of each of said square bundle regions and each of which is arranged between said channel boxes in the center of each of said square bundle regions;

said long blade control rods each having a latitudinal control rod blade length of about of said square bundle regions so as to be twice as long as the latitudinal control rod blade length of each of said short blade control rods; and wherein reactivity control at time of the reactor being shutdown is effected by using said long blade control rods arranged between said channel boxes on the diagonal lines of said square bundle regions.

3. An operation method of a boiling water nuclear reactor core in which a plurality of fuel assemblies, each enclosed in a channel box, are loaded and a plurality of control rods, each having control blades, are arranged between said channel boxes, characterized in that:

long blade control rods, each having control rod blades which extend in four directions and each of which is arranged between channel boxes on a diagonal line of square bundle regions, each square bundle region being formed by a plurality of fuel assemblies;

short blade control rods, each having a latitudinal control rod blade length of about one half of the width of each of said square bundle regions and each of which is arranged between said channel boxes in the center of each of said square bundle regions;

said long blade control rods each having a latitudinal control rod blade length of about one of said square bundle regions so as to be twice as long as the latitudinal control rod blade length of each of said short blade control rods; and wherein reactivity control in normal operation is effected by using said long blade control rods arranged between said channel boxes on the diagonal of said square bundle regions.

* * * * *